UNITED STATES PATENT OFFICE.

EDWARD F. KERN, OF KNOXVILLE, TENNESSEE, ASSIGNOR OF ONE-HALF TO PERCY S. BROWN, OF NEW YORK, N. Y.

METHOD OF MAKING ALUMINUM FLUOSILICATE.

963,156. Specification of Letters Patent. Patented July 5, 1910.

No Drawing. Application filed January 15, 1910. Serial No. 538,245.

*To all whom it may concern:*

Be it known that I, EDWARD F. KERN, a citizen of the United States, residing at Knoxville, in the county of Knox and State of Tennessee, have invented certain new and useful Improvements in Methods of Producing Aluminum Fluosilicate, of which the following is a specification.

This invention relates to the preparation of fluo-silicates, and has particular reference to the production of aluminum fluo-silicate $(Al_2(SiF_6)3)$.

Heretofore aluminum fluosilicate has been chiefly produced by the addition of fluo-silicic acid to freshly precipitated aluminum hydrate. Aluminum fluo-silicate produced in this way is expensive by reason of the cost of the acid used in dissolving the aluminum from which the hydrate is made and the cost of the ammonia used in precipitating the aluminum in the form of the hydrate.

I have discovered that aluminum fluo-silicate can be readily, cheaply and rapidly obtained direct from silicate of aluminum and particularly from kaolin.

In the practice of my process, in its preferred embodiment I mix powdered kaolin and silica in approximately molecular proportions and to this is added hydrofluoric acid in approximately molecular proportions as indicated by the following reaction;

$$Al_2O3.2SiO_2.2H_2O + SiO_2 + 18HF = Al_2(SiF_6)3 + 11H_2O.$$

The kaolin is first mixed with water in order to prevent too rapid reaction which would bring about a loss of acid and the hydrofluoric acid is poured slowly over the mass of kaolin and silica. The temperature at which the hydrofluoric acid reacts with the mixture of kaolin and silica is preferably between atmospheric temperature and the boiling point of the acid, the latter being a solution of hydrofluoric acid gas in water. The reaction produces sufficient heat to cause the solution to boil. The preferred temperature for the reaction is below the boiling point, preferably between 50 and 70 degrees C. At a higher temperature some acid is lost by vaporization. The amount of water may be varied as desired, satisfactory results being obtained when sufficient water is added to form a pasty mass with the kaolin and silica.

While I have illustrated my invention as embodying the use of kaolin it is to be understood that any aluminum silicate or any hydrated aluminum silicate may be employed.

Having described my invention, I claim—

1. The process of preparing aluminum fluo-silicate which consists in reacting upon aluminum silicate and oxid of silicon with hydrofluoric acid.

2. The process of preparing aluminum fluo-silicate which consists in mixing aluminum silicate and silica and adding hydrofluoric acid thereto.

3. The process of preparing aluminum fluo-silicate which consists in mixing aluminum silicate, silica and water and adding hydrofluoric acid thereto.

4. The process of preparing aluminum fluo-silicate which consists in mixing aluminum silicate, silica and hydrofluoric acid in approximately molecular proportions.

5. The process of preparing aluminum fluo-silicate which consists in mixing aluminum silicate, silica and hydrofluoric acid in approximately molecular proportions in the presence of water.

In testimony whereof I affix my signature in presence of two witnesses.

EDWARD F. KERN.

Witnesses:
FREDERIC W. ERB,
ADELE M. ERB.